(12) United States Patent
Ash et al.

(10) Patent No.: US 9,652,406 B2
(45) Date of Patent: May 16, 2017

(54) MRU BATCHING TO REDUCE LOCK CONTENTION

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 14/701,182

(22) Filed: Apr. 30, 2015

(65) Prior Publication Data

US 2016/0321189 A1 Nov. 3, 2016

(51) Int. Cl.
*G06F 12/00* (2006.01)
*G06F 12/123* (2016.01)
*G06F 12/0831* (2016.01)
*G06F 12/128* (2016.01)

(52) U.S. Cl.
CPC ........ *G06F 12/125* (2013.01); *G06F 12/0833* (2013.01); *G06F 12/128* (2013.01); *G06F 2212/62* (2013.01); *G06F 2212/69* (2013.01)

(58) Field of Classification Search
None
See application file for complete search history.

(56) References Cited

U.S. PATENT DOCUMENTS

| | | |
|---|---|---|
| 4,916,605 A | 4/1990 | Beardsley et al. |
| 6,438,661 B1 | 8/2002 | Beardsley et al. |
| 6,490,654 B2 | 12/2002 | Wickeraad et al. |
| 6,615,318 B2 | 9/2003 | Jarvis et al. |
| 6,874,010 B1 | 3/2005 | Sargent |
| 6,901,483 B2 | 5/2005 | Robinson et al. |
| 7,822,939 B1 | 10/2010 | Veprinsky et al. |
| 8,082,397 B1 | 12/2011 | Ezra et al. |
| 2002/0116582 A1 | 8/2002 | Copeland et al. |
| 2003/0033474 A1 | 2/2003 | Lin |
| 2005/0160203 A1 | 7/2005 | Barrick |
| 2006/0069871 A1* | 3/2006 | Gill ............... G06F 12/0862 711/118 |

(Continued)

FOREIGN PATENT DOCUMENTS

EP 1980948 A2 10/2008
WO 03021395 A2 3/2003

(Continued)

OTHER PUBLICATIONS

Jayarekha et al., "An Adaptive Dynamic Replacement Approach for a Multicast based Popularity Aware Prefix Cache Memory System", pp. 24-30, InterJRI Computer Science and Networking, vol. 1, Issue 1, Dec. 2009.

(Continued)

*Primary Examiner* — Baboucarr Faal
(74) *Attorney, Agent, or Firm* — Griffiths & Seaton PLLC (57) ABSTRACT

Data operations, requiring a lock, are batched into a set of operations to be performed on a per-core basis under a single lock. A Most Recently Used (MRU) listing is used to conduct a demotion scan using an MRU flush, a processor identification (ID), and a track change characteristic algorithm.

15 Claims, 5 Drawing Sheets

(56) References Cited

U.S. PATENT DOCUMENTS

| | | |
|---|---|---|
| 2011/0246694 A1 | 10/2011 | Ichinose |
| 2012/0089784 A1 | 4/2012 | Surtani et al. |
| 2013/0339643 A1 | 12/2013 | Tekade et al. |
| 2014/0082296 A1 | 3/2014 | Ash et al. |
| 2015/0026409 A1 | 1/2015 | Ash et al. |

FOREIGN PATENT DOCUMENTS

| | | |
|---|---|---|
| WO | 2013132370 A1 | 9/2013 |
| WO | 2014040840 A1 | 3/2014 |

OTHER PUBLICATIONS

Wong et al., "Modified LRU Policies for Improving Second-level Cache Behavior", 12 pages, Performance Computer Architecture, 2000. HPCA-6. Proceedings. Sixth International Symposium on, pp. 49-60. IEEE, 2000.

Ding et al., BP-Wrapper: A System Framework Making Any Replacement Algorithms (Almost) Lock Contention Free, Mar. 29, 2009, 369-380, United States.

\* cited by examiner

MRU BATCHING TO REDUCE LOCK CONTENTION

BACKGROUND OF THE INVENTION

Field of the Invention

The present invention relates in general computing systems, and more particularly to, systems and methods for increased data management efficiency in computing storage environments.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

One goal of computer storage systems is to reduce the number of destage conflicts when destaging storage tracks from a write cache so that the storage system operates more efficiently and/or faster. A destage conflict can occur when a storage track is being destaged from the write cache while a host is trying to write data to the storage track. Storage systems must create a balance of mitigating these conflicts while providing reliability and without sacrificing overall performance.

SUMMARY OF THE INVENTION

During read hit workload, a data segment such as a track is hit in cache, and must be taken off a Least Recently Used (LRU) list from its current position, and added to a Most Recently Used (MRU) end of the LRU list. To accomplish this task, a lock operation is taken on the LRU list to remove the track and add the track back to the MRU end.

In a multi-core and/or clustered computing environment where multiple processes may have shared access to the LRU list, the tendency for contention on the list lock operation is elevated as a number of computing elements may request the list lock at any one time. Related disclosures have provided various mechanisms to address this potentially elevated contention.

In the present disclosure, various embodiments for data management in a multi-core computing storage environment by a processor device are provided. Data operations, requiring a lock, are batched into a set of operations to be performed on a per-core basis under a single lock. A Most Recently Used (MRU) listing is used to conduct a demotion scan using an MRU flush, a processor identification (ID), and a track change characteristic algorithm.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As aforementioned, during read hit workload, a data segment such as a track is hit in cache, and must be taken off a Least Recently Used (LRU) list from its current position, and added to a Most Recently Used (MRU) end of the LRU list. To accomplish this task, a lock operation is taken on the LRU list to remove the track and add the track back to the MRU end.

In a multi-core and/or clustered computing environment where multiple processes may have shared access to the LRU list, the tendency for contention on the list lock operation is elevated as a number of computing elements may request the list lock at any one time. Related disclosures have provided various mechanisms to address this potentially elevated contention.

An additional challenge in multi-core and/or clustered computing environments arises when the cache is full; as to make space for new Input/Output (I/O) operations, it is necessary for the cache to demote tracks from the LRU list. Since the LRU list may have modified and unmodified tracks, cache may create a "demote ready" list from the LRU list. Tracks can be demoted from the demote ready list.

Typically, a single LRU list is maintained for the multi-core/clustered computing environment, and demotion of tracks is performed by a single thread that takes the lock on the LRU list and scans the LRU list to find candidates for the demote ready list. In a multi-threaded environment (for example, 64 threads), many threads may be processing host I/O operations, and thereby demanding cache space. However, only a single thread is attempting to demote tracks. As a result, after some time has passed, the I/O may begin to queue up for cache space, and data processing efficiency slows to the speed in which the demote scan thread can process track demotions. This potential inefficiency may limit performance of certain workloads. Accordingly, a need exists for a mechanism that addresses this potential limitation.

In view of the foregoing, various embodiments for data management in a multi-core computing storage environment by a processor device are provided. Data operations, requiring a lock, are batched into a set of operations to be performed on a per-core basis under a single lock. A Most Recently Used (MRU) listing is used to conduct a demotion scan using an MRU flush, a processor identification (ID), and a track change characteristic algorithm.

The mechanisms of the illustrated embodiments alleviate the potential inefficiencies described previously by effectively adding additional work on a deferred MRU flush operation. As a result, as the deferred MRU flush operation adds tracks to an active list, the mechanisms of the illustrated embodiments move some tracks from the active list to the demote ready list. This process enables the demote operations to execute as fast as host I/O, since multiple threads may work on demote operations, and the need for an additional acquisition of an active list lock is obviated since the deferred MRU operation already has the lock. In one embodiment, as a result, the mechanisms of the present invention use an MRU operation currently holding an active list lock to also perform demotion operations.

The mechanisms of the illustrated embodiments perform deferred MRU operations for tracks irrespective of whether the tracks are in cache or not. Additionally, when a flush operation is performed when the Cache Directory Control Block (CDCB) array is full, tracks are moved from the LRU list to the demote ready list, essentially acting to add tracks to the active LRU list while also moving tracks from the active LRU list to the demote ready list.

Tracks may also be on a sequential list or a random list while the MRU operation occurs. The MRU operation may cause the track to change from random to sequential, or from sequential to random. If this occurs, when the track is added to the MRU batch array, it remains on an incorrect list. This may cause LRU algorithms that rely on a correct number of tracks listed on a sequential LRU list versus a random LRU list to become inaccurate. Since it is impractical to scan all CPU arrays, and in low I/O scenarios the MRU batch array may retain tracks for a longer period of time, this escalates the inaccuracy counts for the random or sequential lists. The mechanisms of the illustrated embodiments described below further address these deficiencies.

Conventional techniques focus on reducing path length along a "critical section." In reference to the background of the current invention, such a critical section may refer to while a lock is held in the computing storage environment. Again, referring to conventional techniques, if the critical section may not be sufficiently reduced, control blocks are broken up (using, for example, independent lock operations), to reduce the duty cycle of each lock.

In contrast to these conventional techniques, which may serve to increase overhead and resource consumption, the mechanisms of the present invention seek a batching approach, which focuses on the overhead associated specifically with acquiring and freeing the lock itself. This overhead can grow as an exponential basis with the number of CPU cores and running processes in any given computing environment.

The batching methodology described herein in relation to the mechanisms of the illustrated embodiments serves to reduce the frequency at which locks are acquired and freed. In other words, in one example, a particular lock is acquired and freed ten times less, but ten times the work is performed while the lock is held. In this situation, the critical section path length essentially remains the same, however lock contention is dramatically reduced by eliminating much of the lock acquire/free overhead previously described.

In one particular exemplary embodiment, which will be described in more detail, following, so as to enable one of ordinary skill in the art to make and use the present invention, a specific application of batching is applied to the LRU list in a computing storage/cache environment. In the LRU case, list order of tracks becomes important. The conventional approach of breaking a control block up is undesirable, since list order is not maintained across multiple LRU lists (a single LRU list is shared between resources).

Figure 1:
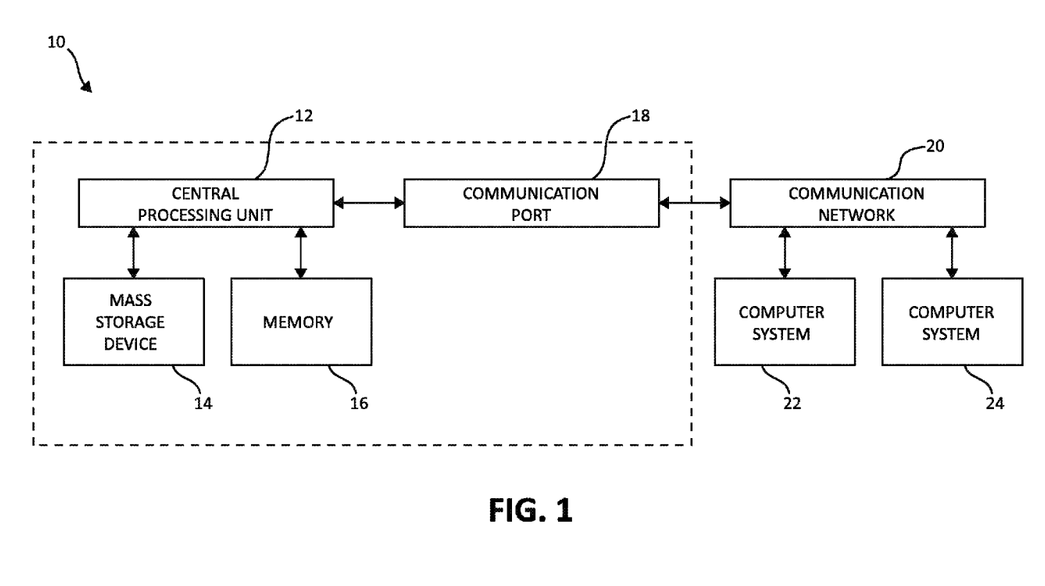
FIG. 1 is an exemplary block diagram showing a hardware structure for cache management in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU), or processor 12, which is connected to communication port 18 and memory device 16. The communication port 18 is in communication with a communication network 20. The communication network 20 and storage network may be configured to be in communication with server (hosts) 22, 24 and storage systems, which may include storage devices 14. The storage systems may include hard disk drive (HDD) devices, solid-state devices (SSD) etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22, 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Memory device 16, in one embodiment, comprises a write cache partitioned into one or more ranks, where each rank includes one or more storage tracks. Memory device 16 may be any cache known in the art or developed in the future.

In various embodiments, processor 12 comprises or has access to a cache/data management module (not shown), which comprises computer-readable code that, when executed by processor 12, causes processor 12 to perform data management operations in accordance with aspects of the illustrated embodiments. In the various embodiments, processor 12 uses batched data operation under single lock to perform data demotion operations by conducting a demotion scan and moving data to a demote ready list while lock is held by a Most Recently Used (MRU) operation.

In various other embodiments, processor 12 acquires a High-Contention Active List lock.

In various other embodiments, processor 12 performs a MRU operation on an instant CDCB and all CDCBs on the applicable array.

In various other embodiments, processor 12 determines whether an applicable demotion scan is high in priority.

In various other embodiments, processor 12 determines whether a count of tracks on the Active List is higher than demote-ready tracks.

In various other embodiments, processor 12 determines whether the instant CDCB is the first CDCB added to the CPU CDCB array batch.

In various other embodiments, processor 12 stores a processor, or CPU identification (ID) and sets a Track_Sequential bit.

In various other embodiments, processor 12 determines whether a track is sequential or random, and moves a certain number of tracks to a sequential or random MRU list.

In various other embodiments, processor 12 determines whether a percentage of the count of demote-ready tracks is less than a number of tracks needed for a high-priority demote scan.

In various other embodiments, processor 12 performs an MRU operation by taking list locks on the sequential and random list, removes a certain number of tracks from its current list and moves the tracks to a new Demote-ready list.

In various other embodiments, processor 12 moves a certain number of tracks from the Active List to the Demote-ready List.

In various other embodiments, the CPU ID is used in the array to remove a certain number of tracks and retrieve the correct CPU CDCB array.

Finally, in various other embodiments, processor 12 releases the Active List Lock.

Figure 2:
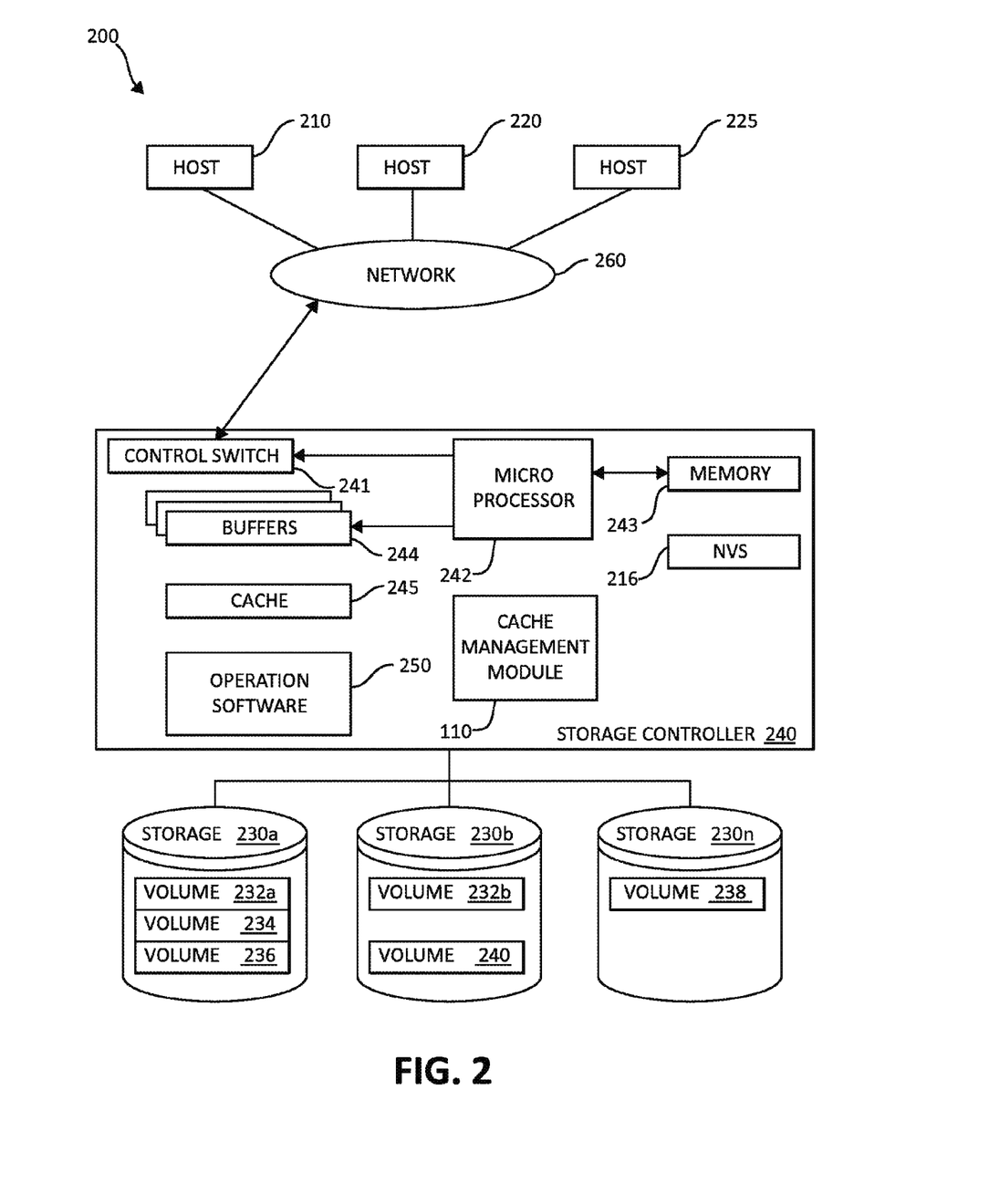
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a cache management module 110. The cache management module 110 may incorporate internal memory (not shown) in which the destaging algorithm may store unprocessed, processed, or "semi-processed" data. The cache management module 110 may work in conjunction with each and every component of the storage controller 240, the hosts 210, 220, 225, and other storage controllers 240 and hosts 210, 220, and 225 that may be remotely connected via the storage fabric 260. Cache management module 110 may be structurally one complete module or may be associated and/or included with other individual modules. Cache management module 110 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the cache management module 110, in which information may be set. The multiple buffers 244 may be implemented to assist with the methods and steps as described herein.

Figure 3:
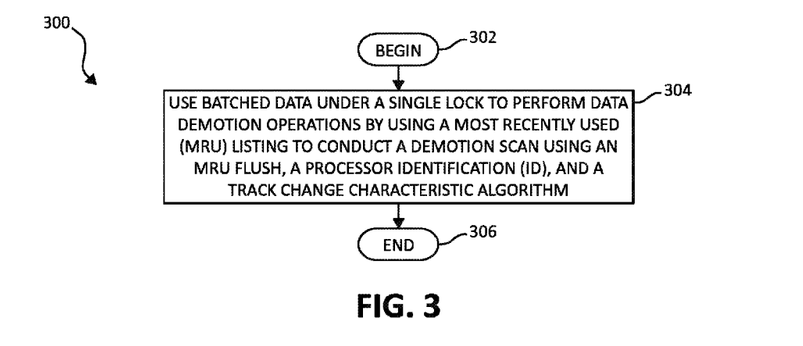
FIG. 3 is a flow chart diagram illustrating an exemplary method for increased efficiency in data management in a computing storage environment, again in which aspects of the present invention may be realized.

Turning now to FIG. 3, a flow chart diagram, illustrating a generalized method method 300 for data management, is depicted. Method 300 begins (step 302). A batched data operation under a single lock is used to perform data demotion operations using an MRU list to conduct a demotion scan using an MRU flush, a processor identification (ID), and a track change algorithm (step 304). The method 300 then ends (step 306).

With the foregoing general methodology in mind, consider the following specific application to an LRU environment in computer storage. In a first step for configuration purposes, a per-CPU array of a certain number (say, N) of Cache Directory Control Blocks (CDCB), using an index or pointer mechanism is added. In addition, a per-CPU Lock (low contention), and a flag bit per CDCB is added. In one embodiment, this flag bit may be termed re-MRU_Owed, indicating when high that the track needs to be-MRUed. In another embodiment, another flag bit may be added, tracking track change characteristics (i.e. whether the track has changed from random to sequential, or sequential to random). This flag bit may be termed Track_Sequential. In still another embodiment, a flag bit may be added determining whether the track is the first track added to the array, or whether a predetermined threshold of time has passed since the track was added. This bit may be termed Time_Since_First_Add.

Once the foregoing configurations have been made, consider the batching methodology reviewed in FIG. 3 specifically applied as a foreground process by, if an instant CPU array is full, MRUing the CDCB and all CDCBs on a particular array once an Active List Lock (high contention) is acquired. Once the lock is acquired, the foreground process then makes determinations as to whether the applicable demote scan is high priority by performing functions such as determining counts of tracks on the Active List and counts of demote ready tracks, for example, as previously described. Under the lock, various demotion activities may then be conducted concurrently by a number of threads, such as moving demotion ready tracks from the Active List. Once these demotion activities have concluded, the lock may then be released.

If the array is not full, the CDCB is added to the CPU CDCB array, and a new flag indicating the CDCB is on a CPU array, is set. Once either of the preceding steps have been accomplished, a Flush operation may then be performed to flush each CPU array.

In one embodiment, the MRU array is flushed if the first track added to the MRU array was added over a predetermined amount of time. A CPU ID may be added to the track when it is added to the array to find the track in the MRU array when it is being demoted.

Track change characteristics may also be followed, such as whether the track changes from a sequential track to a random track, or a random track to a sequential track. If the track changes characteristics in this way, an MRU operation may be performed rather than adding the track to the MRU batch array. If such track is already listed on the MRU batch array, it may be left on the array as it will be listed another time when the MRU batch array is processed and an MRU operation is performed.

With the instant example still in view, in the event of a CDCB demotion from cache (e.g., a new CPU array flag is set), if the instant process leading to the Demote was not pursuant to a directory scan, the track may be skipped (i.e., the track was accessed and will be subsequently MRUed). Alternatively, each of the CPU arrays may be scanned, and the CDCB removed.

Figure 4:
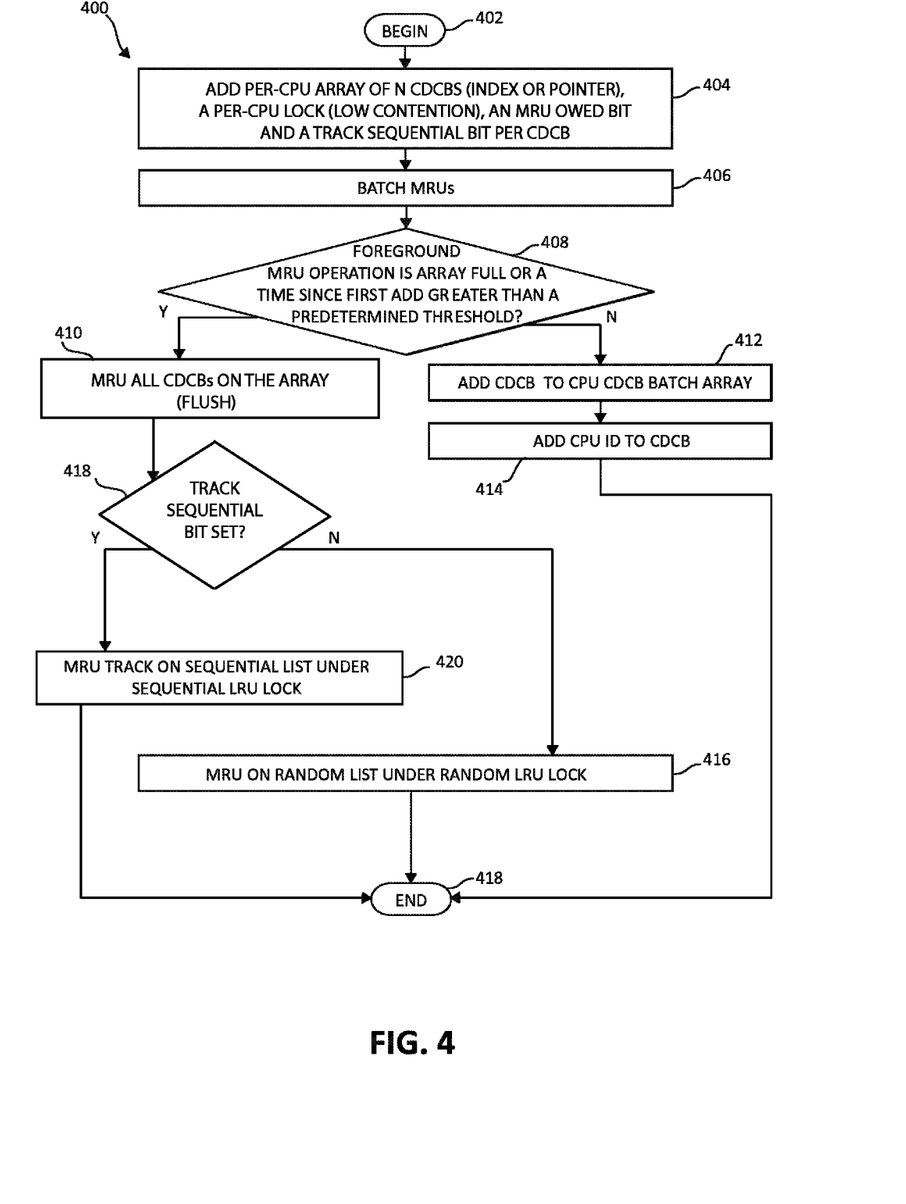
FIG. 4 is an additional flow chart diagram illustrating an exemplary method for performing various operations for data management enhancement, again in which aspects of the present invention may be implemented.

Turning now to FIG. 4, elements of the foregoing example are realized as an exemplary flow chart diagram of a method 400 for data processing, here again in which aspects of the illustrated embodiments may be implemented. Method 400 begins (step 402) with the addition of the per-CPU array of N CDCBs (index or pointer), a per-CPU Lock (low contention), an MRU_Owed bit, and a Track_Sequential bit as previously described (step 404). In step 406, which refers generally to batching MRU's, the method 400 moves to step 408, which in a foreground MRU process, queries if an instant CPU array is filled, or a time since a first track added is greater than a predetermined threshold. If yes, an MRU operation is performed on all CDCBs on the array (step 410). If no, the CDCB is added to the CPU CDCB batch array (step 412), a new flag is set to indicate the CDCB is on the CDCB array, and a CPU ID is added to the CDCB (step 414). The method 400 then ends (step 418).

Returning to step 410, once the high contention active list lock is acquired, as will be further described, a determination of whether a Track_Sequential bit is set (step 418). If yes, an MRU operation on the instant CDCB and all CDCB's on the Array is performed on a sequential list under a sequential LRU list lock (step 420). If no, the track is placed on a random MRU list under a random LRU list lock (step 416), and the method 400 ends (step 418).

In another embodiment, the method 400 may perform some diagnostic determinations of the state of tracks on the active list and demote ready list as follows (not shown). In a following decision step, the method 400 queries whether the demotion scan to be performed is of a high priority. In one embodiment, this may be determined by whether a predetermined threshold of time since one or more tracks were first added has been met. In another embodiment, this may be determined by obtaining a count of free cache segments, and whether a particular threshold has been crossed to indicate that the system is running low on free cache segments. The high priority determination may also be indicated by a count of tracks on the active list higher than demote ready tracks in the following decision. In addition, if a percentage of the count of demote ready tracks is less than tracks deemed to be needed for the high priority demote scan in the following decision step, then the method 400 moves to where a certain number M of tracks deemed necessary in view of the diagnostic operations performed previously are moved from the active list to the demote ready list. The method ends 418.

Consider the foregoing illustrated embodiment in view of the perspective of several storage processes. One exemplary process moves tracks from an Active List to a demote-ready list. In this scenario, if such scan reveals a track which has the Re-MRU_Owed bit set, then the scan will simply re-MRU the track and reset the re-MRU_Owed bit. It will not move the track to the demote ready list.

In one case of a Demote Scan operation, tracks will be examined in the demote ready list and demoted if there are not active users. When the scan reveals a track which has the Re-MRU_Owed bit set, then this scan will remove the track from the demote ready list, and move it to the Active List. The re-MRU_Owed bit is then reset.

In one case of a Demote Track operation, a track may be demoted without passing through the aforementioned Demote Scan operation. For example, a copy target track from before a peer-to-peer relationship was established may be demoted without passing through the Demote Scan operation. An alternative case exists when the host discards the tracks from cache.

When the track is demoted, the cache may check to see if the re-MRU_Owed bit is set. If the bit is set, the Demote Track operation will use the CPU ID in the array to retrieve the correct CPU array and remove the track.

In another example, the Flush operation may be performed if the first track added to the MRU array has resided in the array for a predetermined amount of time. To follow the track within the array, a CPU ID is added to the track when it is added to the MRU array and may be used to locate the track in the MRU array when it is being demoted. A Track_Sequential bit may also be used to track changes in track characteristics. That is, whether a track has changed from sequential to random, or from random to sequential. If the track has found to change characteristics, an MRU operation is performed rather than adding the track to the MRU batch array. If the track is already listed on the MRU batch array, it may be left in the array as it will be re-listed in the MRU one more time when the MRU batch array is processed and an MRU operation is performed.

As previously mentioned, in one embodiment, the Flush operation may be configured as a background process to flush all CPU arrays. The background process may be enhanced in certain embodiments. In one particular embodiment, the background process may increment a 2 bit counter (per-CPU array) once every predetermined time interval, while a foreground CPU process zeroes the 2 bit counter each time the CPU CDCB array is flushed. If the 2 bit counter becomes the value 2, the foreground process flushes its CPU CDCB. Alternatively, if the 2 bit counter becomes the value 3, the background task process flushes that particular CPU's CDCB array.

Figure 5:
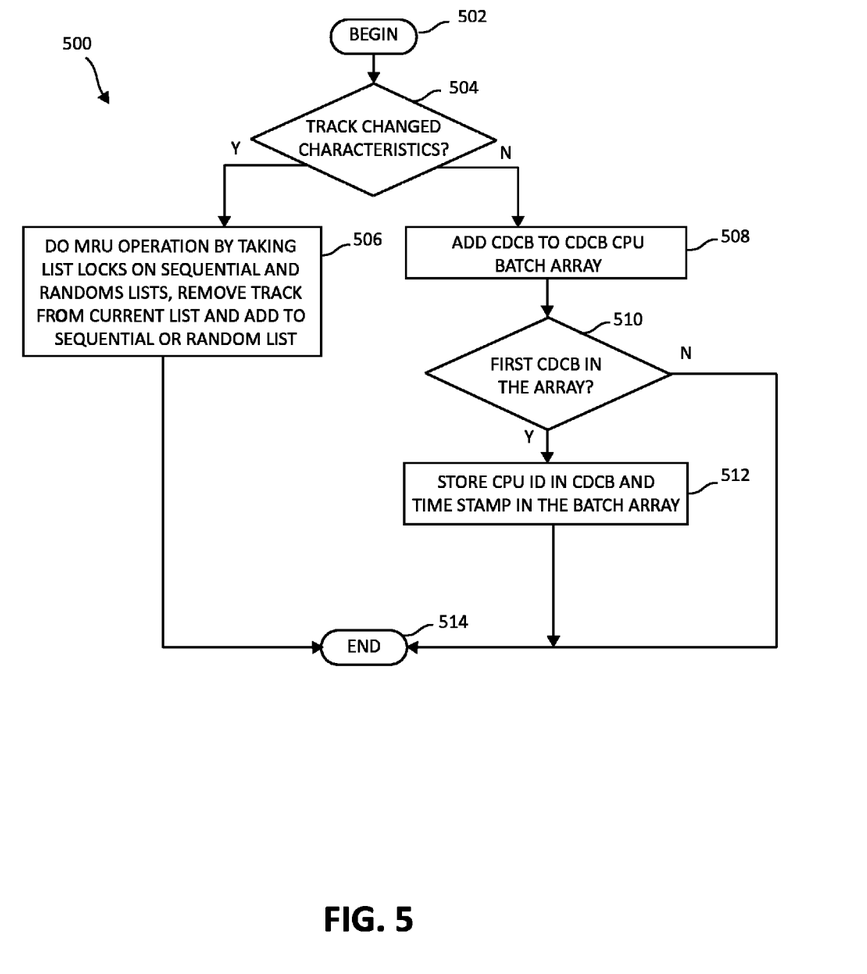
FIG. 5 is still an additional flow chart diagram illustrating an exemplary method for performing various operations for data management enhancement, again in which aspects of the present invention may be implemented.

FIG. 5 further illustrates the methodology of the aforementioned processes, or a method for MRU batching 500. Beginning at step 502, a determination is made of whether the track has changed characteristics (step 504), or changed from a sequential track to a random track or vice versa. If yes, an MRU operation is to be performed, the MRU operation is done by taking list locks on the sequential and random lists, the track is removed from its current listing and the track is added to the sequential list or the random list (step 506). If it is determined the track has not changed characteristics, the CDCB is added to the CDCB CPU batch array (step 508). A determination is made then of whether it is the first CDCB in the batch array (step 510). If not, the method ends (step 514). Otherwise, moving back to step 508, if the CDCB is the first CDCB added, a CPU ID is stored in the CDCB, and a time stamp is stored is stored in the batch array (step 512). The method ends 514.

To help facilitate a further understanding of the aforementioned methodologies, the following example is provided of the previously illustrated steps:

Array of CDCBs Per CPU

Add a per-CPU array of N CDCBs (index or pointer), a per-CPU lock (low contention), and a flag bit per CDCB.

New Bit in CDCB

MRU_Owed bit: Indicating the track needs to be placed on an MRU listing.

New Bit in CDCB

Track_Sequential bit: Indicating the track is sequential and needs to be placed on the sequential list when the MRU batch array is processed.

MRU Operation (End Track Access)

At the end of track access, the track may need to be placed on an MRU listing. This comprises:
  If the array is full, or a predetermined threshold of time has been met (i.e. 10 ms), performing a Foreground MRU operation.
  Acquiring the Active List Lock (high contention).
  If Track_Sequential bit is set, MRU the instant CDCB and all CDCBs on the array (Flush). If Track_Sequential bit is not set, MRU the instant CDCB on random list.
  If the demotion scan is in high priority (i.e. free cache segments are running low), count of tracks on active list is higher than demote ready tracks, and a predetermined percentage threshold of the count of demote ready tracks is less than the number of tracks needed for the high priority demote scan, then:
    Move M tracks from the active list to the demote ready list.
    Release active list lock.
  If track is not changing characteristics, then add the instant CDCB to the CPU CDCB array and set new flag indicating the CDCB is on a CPU array (Batch).
  If the instant CDCB is the first CDCB added, store a time stamp in the array as TIME_SINCE_FIRST_ADD.
  Store CPU ID in the instant CDCB.
  Set Track_Sequential bit in the instant CDCB if the track is to be added to the sequential list.
  Otherwise, the track has changed characteristics (i.e. sequential to random or random to sequential). If the track has changed characteristics, then:
    Perform the MRU operation by taking list locks on sequential and random lists.
    Remove track from its current listing after acquiring lock and add it to the new MRU batch list (if the track already exists on the MRU batch array, keep it at its current listing).

SMP Segment Scan

Scan to move tracks from active list to demote ready list (ULRU). When scan determines a track having the MRU_Owed bit set, the scan will re-MRU the track and reset the MRU_Owed bit. The track is not moved to the demote ready list.

Demote Scan

Scans tracks in the demote ready list and demotes tracks if they are inactive users. When determined a track having the MRU_Owed bit set, the scan will remove the track from the ULRU listing and move it to the active list, resetting the MRU_Owed bit.

Demote Track

Tracks may be demoted without being subject to the demote scan. One example is a flash copy target track being acquired before a relation is established. In another example, a track may be demoted when the host discards the tracks from cache.
When tracks are demoted, it is determined whether the MRU_Owed bit is set. If so, the CPU ID is used in the array to retrieve the correct CPU array and remove the track from its current listing.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for data management in a multi-core computing storage environment by a processor device, comprising:

using a batched data operation under a single lock to perform data demotion operations by using a Most Recently Used (MRU) listing to conduct a demotion scan using at least one of a MRU flush, a processor identification (ID), and a track change characteristic algorithm;

wherein if the priority of a demotion scan is determined to be high, and a count of tracks on an active list is higher than a count of demote ready tracks, and a predetermined percentage of the count of demote ready tracks is less than a number of tracks needed to be freed by the demotion scan, moving the number of tracks from an active list to a demote ready list.

2. The method of claim 1, further including performing flushing the MRU listing if a first track added has existed in the listing for greater than a predetermined threshold of time.

3. The method of claim 1, further including adding the processor ID to a track when it is added to the MRU listing, the processor ID being used to locate the track during demotion operations.

4. The method of claim 1, further including using the track change characteristic algorithm to determine whether to perform an instant MRU operation or add a track to an MRU batch array, wherein if the track has changed characteristics the instant MRU operation is performed, and if the track has not changed characteristics, it is added to the MRU batch array.

5. The method of claim 1, further including determining the priority of the demotion scan by counting a number of free cache segments, wherein if the number of free cache segments is less than a predetermined threshold, designating the priority of the demotion scan as high.

6. A system for data management in a multi-core computing storage environment, comprising:

a processor device, operable in the multi-core computing storage environment, wherein the processor device:

uses a batched data operation under a single lock to perform data demotion operations by using a Most Recently Used (MRU) listing to conduct a demotion scan using at least one of a MRU flush, a processor identification (ID), and a track change characteristic algorithm;

wherein if the priority of a demotion scan is determined to be high, and a count of tracks on an active list is higher than a count of demote ready tracks, and a predetermined percentage of the count of demote ready tracks is less than a number of tracks needed to be freed by the demotion scan, moves the number of tracks from an active list to a demote ready list.

7. The system of claim 6, wherein the processor device performs flushing the MRU listing if a first track added has existed in the listing for greater than a predetermined threshold of time.

8. The system of claim 6, wherein the processor device adds the processor ID to a track when it is added to the MRU listing, the processor ID being used to locate the track during demotion operations.

9. The system of claim 6, wherein the processor device uses the track change characteristic algorithm to determine whether to perform an instant MRU operation or add a track to an MRU batch array, wherein if the track has changed characteristics the instant MRU operation is performed, and if the track has not changed characteristics, it is added to the MRU batch array.

10. The system of claim 6, wherein the processor device determines the priority of the demotion scan by counting a number of free cache segments, wherein if the number of free cache segments is less than a predetermined threshold, designating the priority of the demotion scan as high.

11. A computer program product for data management in a multi-core computing storage environment, the computer program product comprising a non-transitory computer-readable storage medium having computer-readable program code portions stored therein, the computer-readable program code portions comprising:

a first executable portion that uses a batched data operation under a single lock to perform data demotion operations by using a Most Recently Used (MRU) listing to conduct a demotion scan using at least one of a MRU flush, a processor identification (ID), and a track change characteristic algorithm;

wherein if the priority of a demotion scan is determined to be high, and a count of tracks on an active list is higher than a count of demote ready tracks, and a predetermined percentage of the count of demote ready tracks is less than a number of tracks needed to be freed by the demotion scan, moves the number of tracks from an active list to a demote ready list.

12. The computer program product of claim 11, further including a second executable portion that performs flushing the MRU listing if a first track added has existed in the listing for greater than a predetermined threshold of time.

13. The computer program product of claim 11, further including a second executable portion that adds the processor ID to a track when it is added to the MRU listing, the processor ID being used to locate the track during demotion operations.

14. The computer program product of claim 11, further including a second executable portion that uses the track change characteristic algorithm to determine whether to perform an instant MRU operation or add a track to an MRU batch array, wherein if the track has changed characteristics the instant MRU operation is performed, and if the track has not changed characteristics, it is added to the MRU batch array.

15. The computer program product of claim 11, further including a second executable portion that determines the priority of the demotion scan by counting a number of free cache segments, wherein if the number of free cache segments is less than a predetermined threshold, designating the priority of the demotion scan as high.

* * * * *